United States Patent
Hayashi (10) Patent No.: US 8,134,937 B2
(45) Date of Patent: Mar. 13, 2012

(54) DISTRIBUTED CONTENT STORAGE SYSTEM, CONTENT STORAGE METHOD, NODE DEVICE, AND NODE PROCESSING PROGRAM

(75) Inventor: Koichi Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 410 days.

(21) Appl. No.: 12/073,350

(22) Filed: Mar. 4, 2008

(65) Prior Publication Data

US 2008/0291926 A1 Nov. 27, 2008

(30) Foreign Application Priority Data

May 23, 2007 (JP) ................................. 2007-136519

(51) Int. Cl.
*H04L 12/28* (2006.01)
*G06F 15/16* (2006.01)

(52) U.S. Cl. ....................................... 370/255; 709/231
(58) Field of Classification Search ........................ None
See application file for complete search history.

(56) References Cited

U.S. PATENT DOCUMENTS

| 7,512,964 | B2 * | 3/2009 | Rodriguez et al. | 725/142 |
|---|---|---|---|---|
| 7,627,560 | B2 * | 12/2009 | Watanabe et al. | 707/3 |
| 2006/0168104 | A1 * | 7/2006 | Shimizu et al. | 709/218 |
| 2007/0107039 | A1 * | 5/2007 | Miyakawa et al. | 725/142 |
| 2007/0133587 | A1 | 6/2007 | Hibino et al. | |
| 2007/0143816 | A1 * | 6/2007 | Gupta et al. | 725/135 |
| 2007/0283043 | A1 | 12/2007 | Kiyohara et al. | |
| 2008/0133767 | A1 * | 6/2008 | Birrer et al. | 709/231 |
| 2008/0276091 | A1 * | 11/2008 | Welin et al. | 713/170 |
| 2009/0106802 | A1 * | 4/2009 | Zuckerman et al. | 725/91 |

FOREIGN PATENT DOCUMENTS

| JP | A 2004-320455 | 11/2004 |
|---|---|---|
| JP | A 2006-33514 | 2/2006 |
| JP | A 2006-197400 | 7/2006 |

* cited by examiner

*Primary Examiner* — Hassan Phillips
*Assistant Examiner* — Eunsook Choi
(74) *Attorney, Agent, or Firm* — Oliff & Berridge, PLC (57) ABSTRACT

A node device included in a distributed content storing system configured that a plurality of content data are distributed and stored in a plurality of node devices mutually communicable through a network, and node information of the node device storing the above content data is registered in the node device administrating the content data, the node device including:
  a content receiving means for receiving the content data broadcasted;
  a storage determining means for randomly determining whether content data as much as a unit are stored when the content data as much as the unit are received;
  a storing means for storing the content data thus determined; and
  a registration message transmission means for sending a registration message, provided to make own node information as the node device storing the content data, to the node device administrating the content data when the content data are stored.

10 Claims, 5 Drawing Sheets

TREE-TYPE CONTENT BROADCASTING SYSTEM

FIG. 3

DISTRIBUTED CONTENT STORAGE SYSTEM

DISTRIBUTED CONTENT STORAGE SYSTEM, CONTENT STORAGE METHOD, NODE DEVICE, AND NODE PROCESSING PROGRAM

The entire disclosures of Japanese Patent Application No. 2007-136519 filed on May 23, 2007 including the specification, claims, drawings and summary are incorporated herein by reference in its entirety.

BACKGROUND OF THE INVENTION

1. Field of the Invention

The present invention relates to an information communication system of a peer to peer (P2P) type including a plurality of node devices, mutually communicable through a network.

2. Related Art

In recent years, quality of content to be recorded by a personal user is being enhanced in sake of digital broadcasting, hard disk recorder, reservation using G code (coding elements (a record date, a record channel, a record start time, and a record end time) for reserving to record programs), automatic CM (Commercial Message) cull.

For example, Japanese Unexamined Patent Publication No. 2004-320455 discloses a program recording system including a plurality of recording devices which record program data containing images and voices of a program now on air, a program database device for recording program information indicative of at least a broadcast start time and a broadcast end time with respect to each of programs to be broadcasted, and a server device connected to the program database device. In this program recording system, in a case where a starting time of recording the broadcast data in a recording device is behind a broadcast starting time, program data of a required program between the broadcast starting time and a broadcast ending time are searched out of the program data, recorded in each recording device with a server device. The program data thus searched is acquired and recorded by a recording device which has failed to record the program data. Accordingly, it is possible to search required program data out of program data in predetermined program data, recorded after a broadcast starting time by a recording device. Then it becomes possible to send and receive the program data among the recording devices.

Meanwhile, as a mode of broadcasting content, there is known tree-type broadcasting of a peer-to-peer type as disclosed in Japanese Unexamined Patent Publication No. 2006-33514. In this tree type broadcasting system, each node device has topology information for identifying a network connection relationship. In the tree-type broadcasting system, each node device is connected to a node device recognized using the topology information and existing in an upper hierarchy (upper stream), receives stream data sent from the node devices in the upper hierarchy, and transfers (relays) the data to node devices in lower hierarchies. Because of such the structure, each node devices participating in the tree-type broadcasting system can enjoy stream distribution service of content data and reproduce these.

SUMMARY OF THE INVENTION

However, in the program recording system and internet distribution system described above, there is a problem that an excessive load is applied to the server device when number of users increases since the server device undertakes receipt and transfer of content data such as program data or the like between the recording devices.

Further, there is a problem in a case where all content data which has been broadcasted are stored in a memory (recording) device such as a hard disk drive (HDD) included in a node device that a memory capacity of the memory device is occupied by such the content data.

The present invention is provided to solve the above problems. An object of the present invention is to provide a distributed content storage system, a content storage method, a node device, and a node processing program, respectively enabled to reproduce content data previously broadcasted in use of a memory device in each node device, without applying an excessive load particularly to a certain device To solve the above problem, according to the first aspect of the present invention, there is provided a node device included in a distributed content storing system constructed such that a plurality of content data are distributed and stored in a plurality of node devices mutually communicable through a network, and node information of the node device storing the above content data is registered in the node device administrating the content data, the node device including:

a content receiving means for receiving the content data broadcasted;

a storage determining means for randomly determining whether or not content data as much as a unit are stored in a case where the content data as much as the unit are received;

a storing means for storing the content data as much as the unit thus determined to store; and a registration message transmission means for sending a registration message, provided to make own node information as the node device storing the content data, to the node device administrating the content data in a case where the content data as much as the unit are stored.

According to this invention, it is constructed such that in a case where the content data as much as the unit broadcasted are received, each node device randomly determines whether or not the content data as much as the unit are stored. In a case where the content data as much as the unit are stored, a registration message for registering the own node information as the node device storing the content data to the node device administrating the content data. Therefore, it is possible to acquire and reproduce the content data as much as the unit previously broadcasted, which are not stored in the own node device, from the other node device by efficiently using memory devices respectively in the node devices without applying an excessive load particularly to a certain device such as a server device.

According to the present invention, in a case where broadcasted content data of a predetermined unit is received, each of the node devices determines whether or not the broadcasted content data of the predetermined unit is to be stored. In a case where the content data are stored, it is constructed such that a registration message for registering own node information as the node device storing the content data is sent to a node device which manages the content data. Therefore, it is possible to acquire the broadcasted content data of the predetermined unit, which is not stored respectively by own node devices, and reproduce these by efficiently using memory devices respectively in the node devices.

DESCRIPTION OF THE PREFERRED EMBODIMENTS

Preferred embodiments of the present invention will be described as follows. Hereinafter, each designation of numerical reference in the drawings is typically as follows:
8: Network;
9: Overlay Network;
11: Control Unit;
12: Memory Unit;
13: Buffer Memory;
14: Decoder Unit;
15: Image Processing Unit;
16: Display Unit;
17: Sound Processing Unit;
18: Speaker;
19a: Communication Unit;
19b: Input Unit;
19c: Bus;
Nn: Node; and
S: Communication System Hereafter, best embodiments of the present invention will be explained on the basis of figures. Embodiments explained below are modes of carrying out the present invention in a case where the present invention is applied to a communication system.

[1. Configuration or Otherwise of Communication System]

First, a schematic configuration or otherwise of a communication system according to the present embodiment will be described in reference of FIG. 1.

Figure 1:
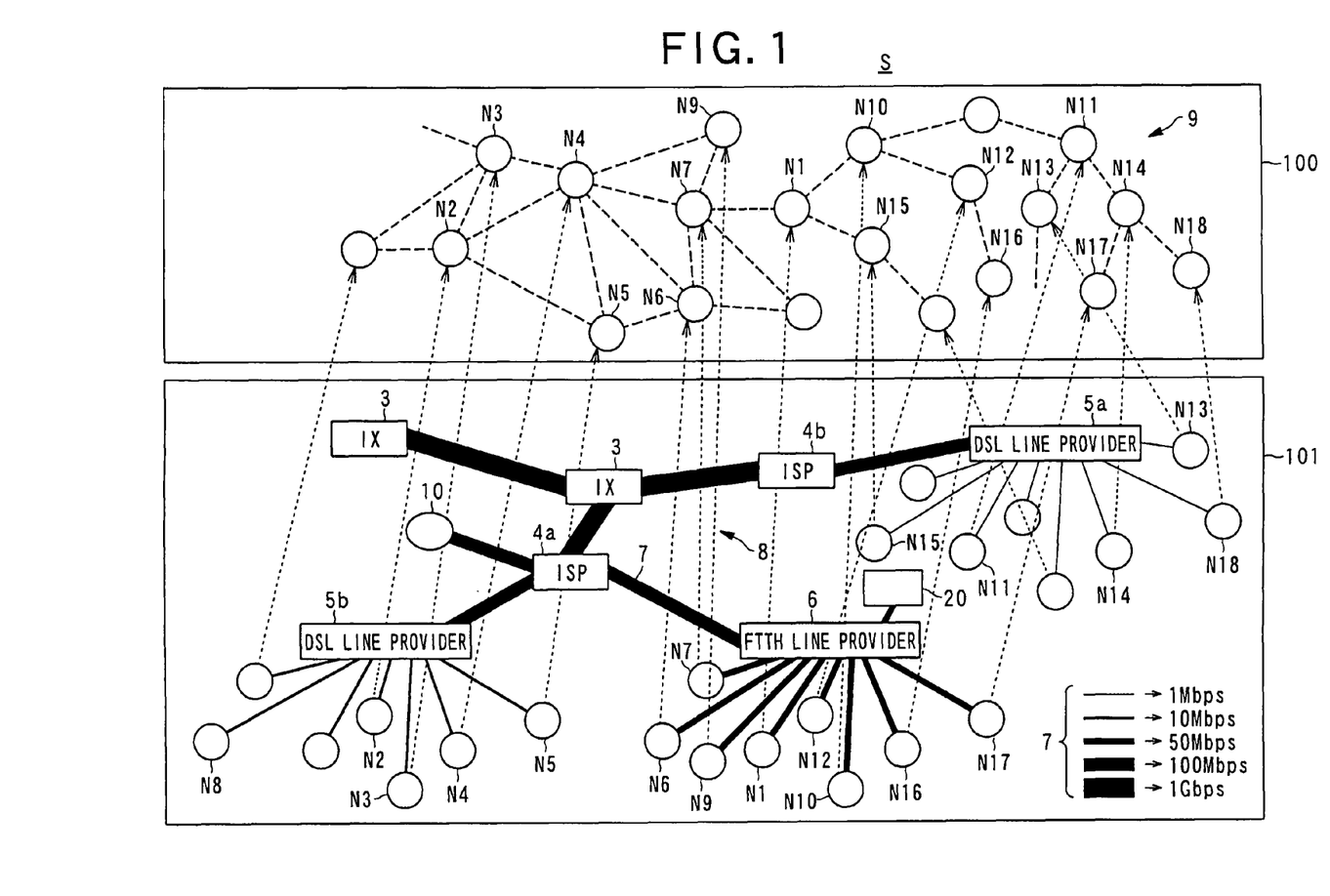
FIG. 1 shows an example of a connection mode of node devices in a communication system according to the present embodiment.

FIG. 1 is a view showing an example of connection mode of each node device in a communication system according to the present embodiment.

As shown in a lower rectangular frame 101 in FIG. 1, a network 8 of the internet is constructed by an internet exchange (IX) 3, internet service providers (ISP) 4a and 4b, digital subscriber line (DSL) provider (or their device) 5a and 5b, fiber to the home line (FTTH) provider (or their device) 6, and communication line (for example, a telephone line or an optical cable) 7 or otherwise. Here, in a network (communication network) 8 in an example of FIG. 1, routers for transferring data (packet) are appropriately inserted (not shown).

A plurality of node devices (hereinafter, referred to as "node") Nn (any one of =1, 2, 3 . . . ) are connected to the network 8. A unique manufacturing number and a unique internet protocol (IP) address are assigned respectively to the nodes Nn. Such the manufacturing number and internet protocol (IP) address do not overlap among the plurality of nodes.

The communication system S according to the present embodiment is a network system of a peer to peer type, which is formed by participation of any of the plurality of nodes out of the nodes Nn, as illustrated inside the upper column 100 in FIG. 1. The network 9 shown inside the upper column 100 in FIG. 1 is an overlay network 9 (logical network) that constitutes a virtual link formed in use of a network already available.

Further, this communication system S is configured by a tree-type content broadcasting (distributing) system and a content distribution (type) storing system.

[1-2. Structure and Function of Tree-Type Content Broadcasting System]

Here, the tree-type content system will be described.

Figure 2:
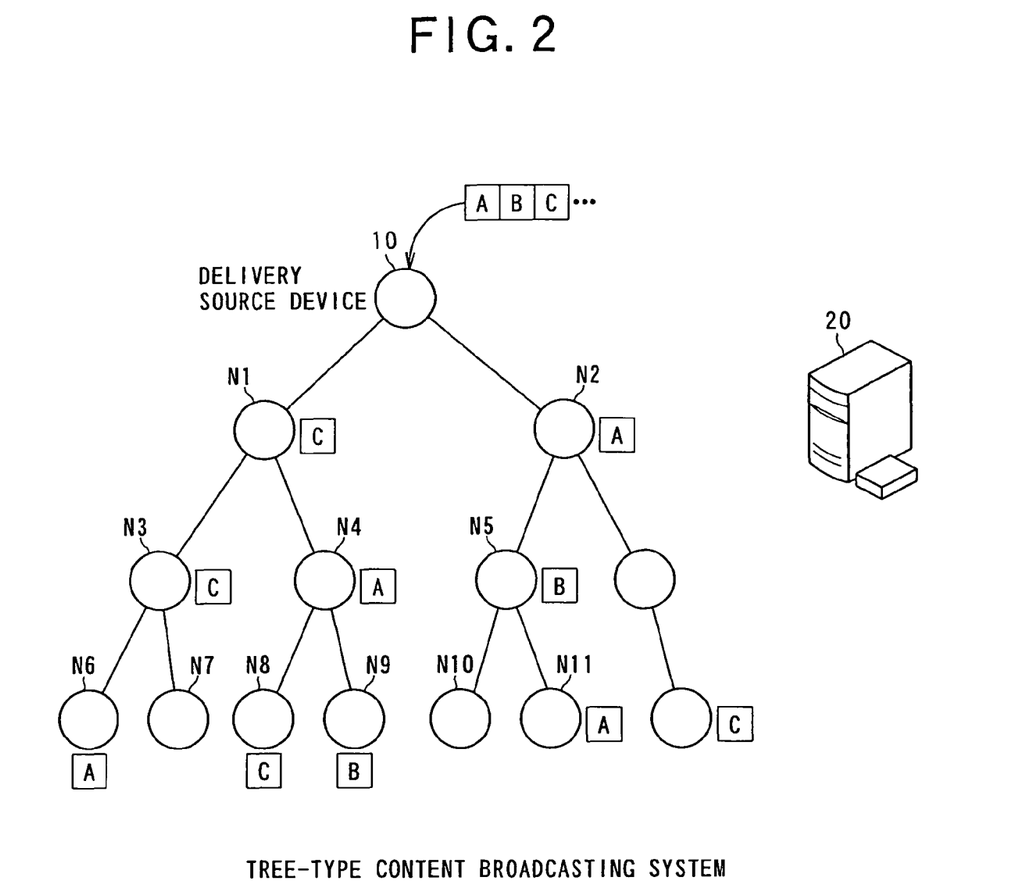
FIG. 2 is a schematic view showing broadcasting of content data of each unit in a tree-type content broadcasting system.

FIG. 2 is a schematic view showing a state that content data are broadcasted in a tree-type content broadcasting system.

The tree-type content broadcasting system is formed in a tree-like shape having a delivery source device 10 at its top and the plurality of node devices connected through networks so as to form a plurality of hierarchies, as illustrated in FIG. 2. Content data broadcasted (stream delivery) through the delivery source device 10 are sequentially transferred from the node Nn (hereinafter referred to as upstream) in an upper hierarchy to the node Nn (hereinafter referred to as downstream) in a lower hierarchy.

A topology (mode of connecting nodes Nn) in such the tree-type content broadcasting system is constructed with respect to each of the broadcast channels and is managed by a topology management database in the connection destination introducing server 20. Such the topology management database has network address information (e.g. IP address and port number) of the delivery source device and the nodes Nn participating in the tree-type topology, hierarchies where each of the nodes Nn belongs in the topology, downstream node information indicative of downstream nodes respectively for the delivery device and the nodes Nn, a connection permissible number for the downstream of connecting to the delivery device and the nodes Nn, a transfer ability for the delivery device and the nodes Nn of transferring the content data to other nodes Nn, registered in it with respect to each of the broadcasting channels. Here, the transfer ability is for example a processing speed (GHz) of CPU and an effective band (e.g. data transfer speed (bps)) in the network 8.

In a case where the connection destination introducing server 20 receives a request for participating in a topology related to a specific broadcasting channel which is selected in a certain node Nn, the connection destination introducing server 20 searches for an upstream node (node Nn capable of connecting to a downstream side) having number of connected downstream nodes being smaller than its connection permissible number out of the topology administration database, and the connection destination introducing server 20 introduces one or more candidates for such the upstream node as a destination of the connection (notification of the network address information of the upstream node). By this, the node Nn requested to participate is connected to the upstream node thus introduced and receives stream of content data which are transmitted from the upstream node.

Meanwhile, a series of content data are sequentially broadcasted in time series based on a broadcasting schedule from the delivery source device. Such the content data can be compartmentalized by every predetermined time like content data A, content data B, and content data C, as illustrated in FIG. 2. This compartmentalization is determined in response to substance of programs, movies or the like. For example, the content data A are data of a so-called variety program, the content data B are data of a certain news program, and the content data C are data of a certain movie. A unit respectively of these compartmentalized content data is referred to as "content data as much as unit".

Each of the nodes Nn that receive the content data thus transmitted randomly determines whether or not content data of a certain unit among a series of content data is to be stored. When it is determined to store the content data, only the content data as much as the unit thus determined to store are memorized and stored in a memory unit (memory device) such as HDD. For example, Node N1 stores only content data C of the unit, and mode N2 stores only content data A of the unit, as illustrated in FIG. 2.

The content data as much as the unit thus stored can be presented in response to inquiry from other nodes Nn in a distributed content storing system to be described later.

[1-3. Structure, Function or Otherwise of Distributed Content Storing System]

Next, the distributed content storing system will be described.

In the distributed content storing system, a plurality of content data are distributed and stored into a plurality of node devices participating in this system. Node information (e.g. node ID, IP address, and port number, being unique identification information allocated to the node Nn) of a node Nn storing the content data is registered in a root node which manages the content data so as to be provided upon request of other nodes. Each of the nodes can participate both of the tree-type content broadcasting system and the distributed content storing system.

Further, the node ID having a predetermined digits and allocated to each of the node Nn participating in the distributed content storing system is for example a value (e.g. a bit length of 160 bits) obtained by hashing an IP address of a production number, individually allocated to each of the nodes, with a hash function (e.g. SHA-1) commonly used. The node IDs are dispersed and arranged without deviation inside one ID area.

Participation in the distributed content storing system is initiated when a non-participant node requests participation to an already participating node Nn (e.g. contact node always participating in the system) arbitrarily determined.

Each of the nodes participating in the distributed content storing system respectively retains a routing table using distributed hash table (DHT). This routing table stipulates a transfer destination of various messages in the distributed content storing system. Specifically, a plurality of node information pieces of the node Nn, appropriately apart inside the ID space, are registered in the routing table.

One node Nn participating in the distributed content storing system registers node information of minimum requisite nodes into its routing table. With respect to the node Nn not known (not memorized), various messages are transferred to be exchanged mutually among the nodes Nn.

Because such the routing table using DHT is known in for example U.S. Unexamined Patent Publication No. 2007-283043 (Japanese Unexamined Patent Publication No. 2006-197400), a detailed explanation thereof is omitted.

Meanwhile, the node Nn storing content data corresponding to each unit broadcasted from a delivery source device 10 in the tree-type content broadcasting system is formed to send publish message, being registration massage for registering own node information as content retention node which stores the content data, to the root node managing the content data.

Here, content IDs unique to each content data are added to the content data corresponding to each of the units. This content ID is generated by hashing broadcasting channel, broadcasting date (starting time) or the like in use of hash function commonly used in obtaining the node ID and is arranged in an ID space same as that of the node ID. The content ID may be generated on the basis of the broadcasting channel, the broadcasting date (starting time) or the like by each of the nodes Nn or may be added to the content data corresponding to each of the units broadcasted.

Further, the content ID of the content data corresponding to the unit and the own node information are included in the publish message transmitted from the node Nn storing the contents data corresponding to the unit. The publish message arrives at a route node having a node ID closest to the content ID (for example, an uppermost digit matches each other). Then node information of the content retention node included in the publish message and index information including a group of the content IDs are registered in the root node (memorized in the index cash area) As such, the index information concerning the content data A corresponding to the unit is managed by for example node N14, being the root node of the content (the content ID), and the index information concerning the content data B corresponding to the unit is managed by for example node N18, being a root node of the content.

As for DHT routing, because it is disclosed in U.S. Unexamined Patent Publication No. 2007-283043 (Japanese Unexamined Patent Publication No. 2006-197400), a detailed explanation thereof is omitted.

In a case where a user of the certain node Nn participating in the distributed content storing system wishes to acquire the content data corresponding to unit desired and to watch and listen the same, the node Nn wishing to acquire the content data (hereinafter referred to as user node) generates a message (query) of inquiring (searching) existence of content including the content ID of the content data corresponding to the units thus designated and the own node information and transmits thus generated to the other node Nn in accordance with the own routing table using DHT. In other word, the user node transmits the content existence inquiry message to the route node (bound for the route node). Thus, the content existence inquiry message finally arrives at the route node by the DHT routing table using the content ID as a key in a manner similar to the publish message.

The root node receiving the content existence inquiry message acquires the index information corresponding to the content ID included therein and returns the index information to the user node which transmits the content existence inquiry message. By this, the user node transmits the content transmission request message to the content retention node storing the content corresponding to the desired units. The user node receives the content data from the content retention node to thereby enable reproduction of the same.

Or the root node sends the content transmission request message to the content retention node indicated by the node information contained in the index information. By this, the user node receives the content data from the content retention node thereby enabling to reproduce these.

Figure 3:
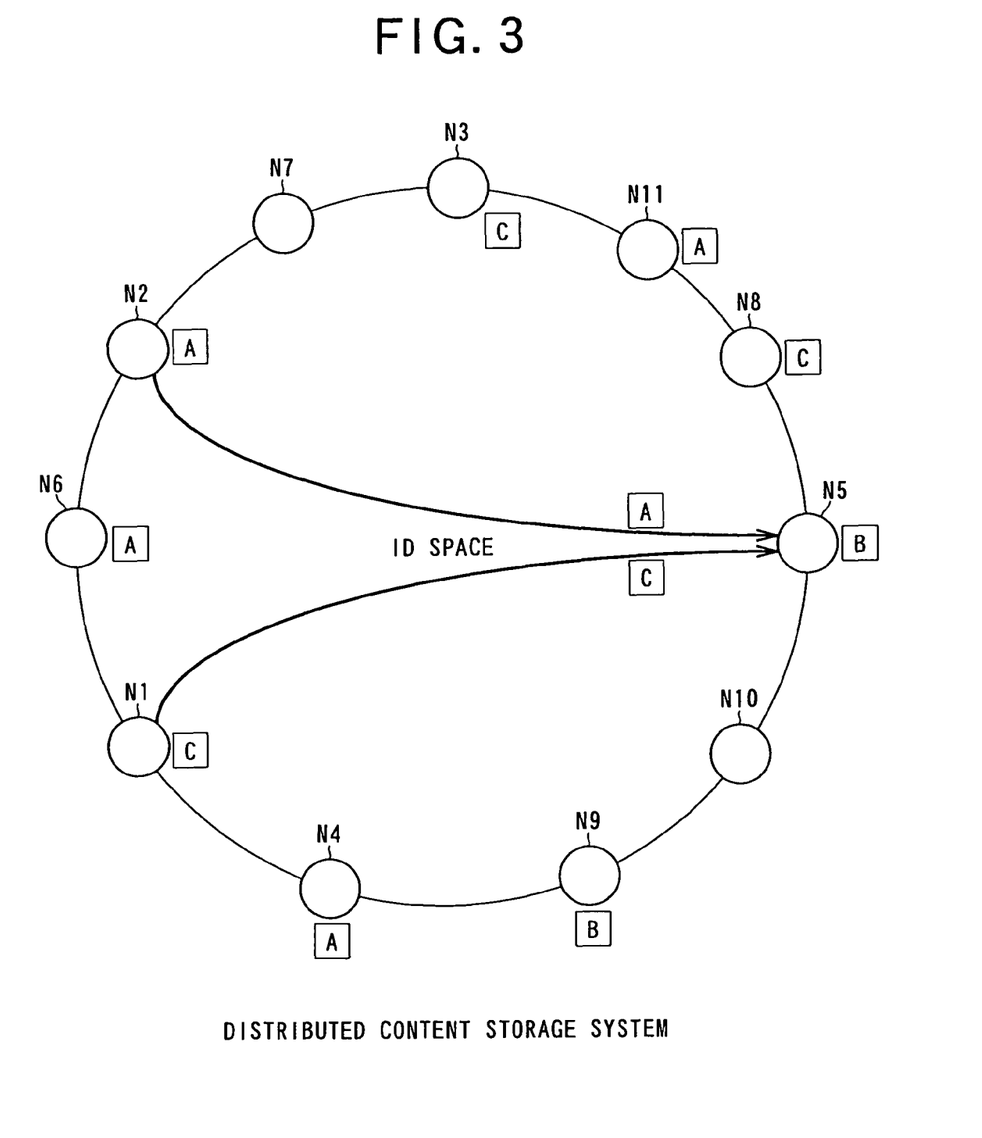
FIG. 3 is a schematic view showing a state that a user node acquire the content data as much as the units from a content retention node.

FIG. 3 is a schematic view showing a way that content data of respective units are obtained from the content retention node by the user node. In an example shown in FIG. 3, node N5 being the user node receives content data A and C as much as the units, not stored by the user node itself, from nodes N2 and N1, being the content retention node.

[1-4. Structure, Function and Otherwise of Node Nn]

Next in reference of FIG. 4, structure and function of node Nn will be described.

Figure 4:
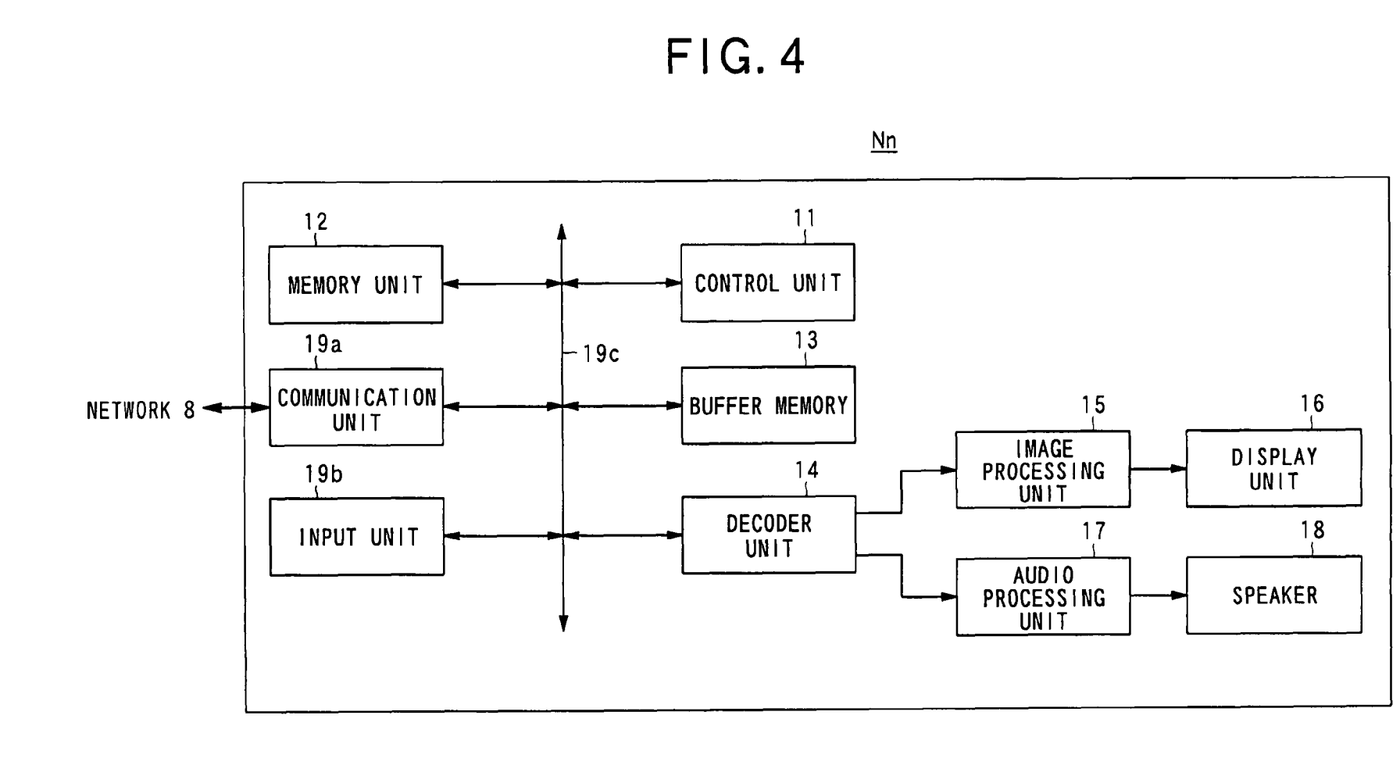
FIG. 4 shows an example of schematic structure of node Nn.

FIG. 4 shows an example of schematic structure of node Nn.

As shown in FIG. 4, each of the nodes Nn includes a control unit 11 as a computer configured by CPU having an operation function, a working RAM, and a control unit 11 as a computer configured by various data, ROM memorizing a program or the like; a memory unit 12 configured by an HDD for memorizing and storing (accommodating) various data (e.g. content data, index data, and DHT) and various programs; a buffer memory 13 for temporarily accumulating content data received and otherwise; a decoder unit 14 for decoding (e.g.

data extension and decryption) video data (image information), audio data (audio information) and otherwise, contained in the content data and encoded; an image processing unit 15 for providing a predetermined depicting process to the video data and so on thus decoded and outputting thus decoded as a video signal; a display unit 16 such as a CRT or a liquid crystal display for displaying image cased on the video signal outputted from the image processing unit 15; an audio processing unit 17 for converting the audio data thus decoded to an analogue audio signal by a digital (D) to analogue (A) conversion amplifying and thereafter amplifying thus converted with an amplifier and outputting this; a speaker 18 for outputting the audio signal thus outputted from the audio processing unit 17 as acoustic wave; a communication unit 19a for carrying out communication control of information with respect to the other nodes Nn and a connection destination introduction server 20 or the like through the network 8; and an input unit 19b (e.g. keyboard, mouse, operation panel, and remote controller for providing the control unit 11 with an instruction signal corresponding to instruction received from a user, wherein the control unit 11, the memory unit 12, the buffer memory 13, the decoder unit 14, the communication unit 19a, and the input unit 19b are mutually connected through a bus 19c.

The node Nn is for example a personal computer, a set top box (STB), and a TV receiver.

Further, the memory unit 12 memorizes an IP address and a port number respectively of a connection destination introduction server 20, being an access destination in participating in the tree-type content broadcasting system, an IP address and a port number respectively of a contact node, being an access destination in participating in the distributed content storage system, and otherwise.

The control unit 11 functions as a content receiving means, a storage determining means, a storing means, a registration message transmission means, and a broadcasting channel determining means according to the present invention by reading out with a CPU a program (including node processing program according to the present invention) and so on, memorized in a memory unit 12 or the like, and executing the program thus read out to thereby totally controlling an entire system.

Specifically, the control unit 11 controls receipt of packet of the content data, delivered from a delivery source device 10 or the upper stream node upon participation of the control unit in the tree-type content broadcasting system. Packets of the content data thus received are accumulated in the buffer memory 13 made of a ring buffer in for example a first-in first-out form (FIFO). When it is accumulated as much as a predetermined amount, the content data are read out and decoded by the decoder unit 14. Thereafter, the packets are reproduced and outputted through an image processing unit 15, the display unit 16, the sound processing unit 17 and the speaker 18.

Further, in a case where the content data of a predetermined unit are received (accumulated in the buffer memory), the control unit 11 randomly determines whether or not the content data as much as the unit are to be stored. For example, such the determination is carried out every receipt of the content data as much as the unit.

In a case where the control unit determines to store the content data as much as the unit, the control unit 11 memorizes and stores the content data as much as the unit in the memory unit 12 (i.e. transferring from the buffer memory to an HDD). As such in a case where the content data as much as the unit are stored, the control unit generates publish message having the content ID of the content data included in it and controls to send into the root node.

For example, the above node processing program may be downloaded from a predetermined server on the network 8. For example, it may be read in from a recording medium such as CD-ROM through a drive for the recording medium.

[2. Operation of Communication System]

Next, operation of the communication system according to the present embodiment will be described in reference of FIG. 5.

Figure 5:
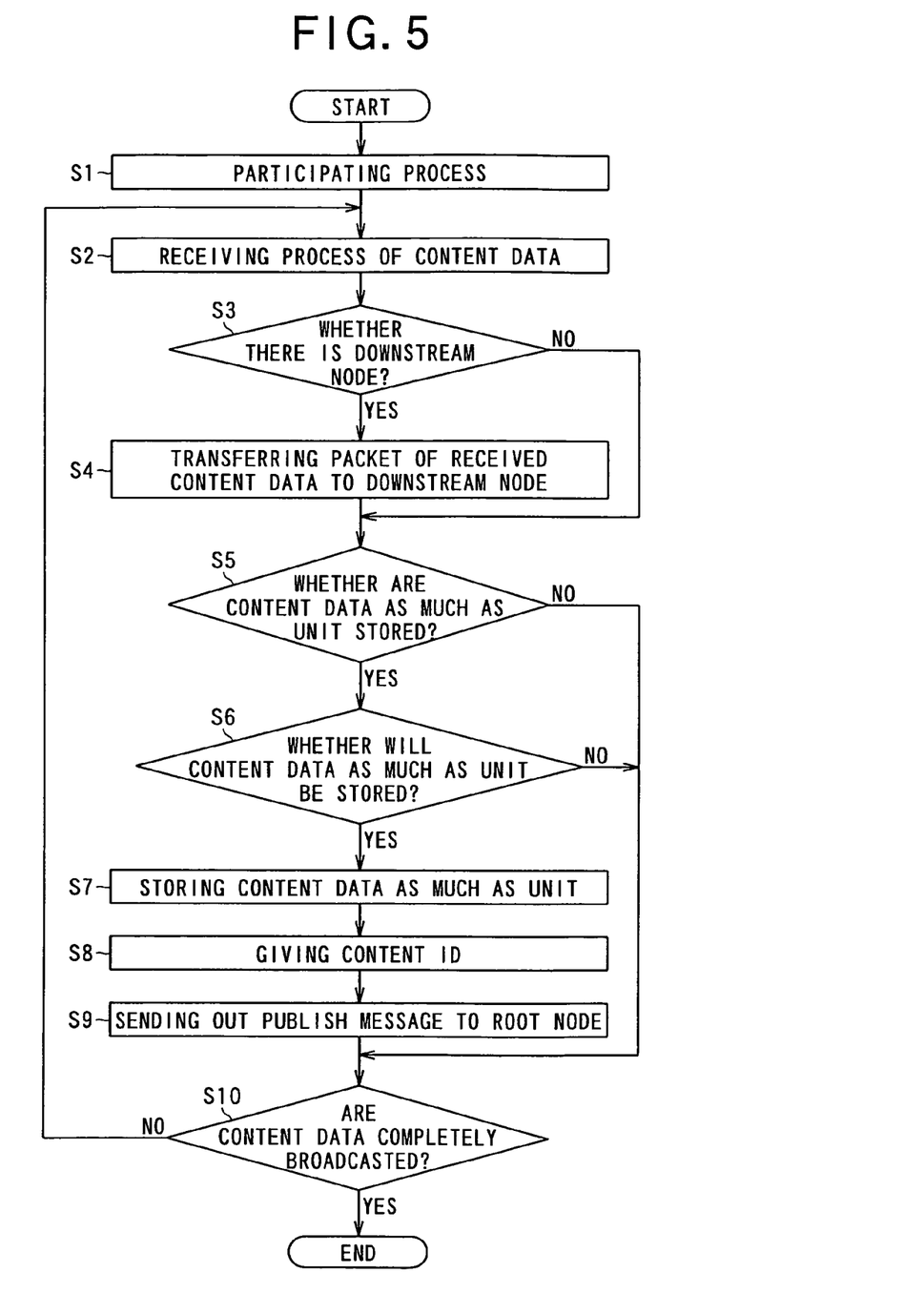
FIG. 5 is a flow chart showing a process in a control unit 11 of node Nn.

FIG. 5 is a flow chart showing process in the control unit 11 of the node Nn.

It is on a premise that the node Nn already participates in the distributed content storage system.

The process shown in FIG. 5 is started for a user of selecting (designating) a broadcasting channel or switching over to select the broadcasting channel. First, the control unit 11 carries out a process (Step S1) of participating in the tree-type content broadcasting system (in other words, topology related to the broadcasting channel). In such the participating process, as described above, network address information of an upper stream node (or delivery source device 10), to be connection destination, is acquired by requesting a participation into a topology related to the broadcasting channel, selected by the node Nn after connecting to the connection destination introduction server 20. Then it is connected to the upper stream node in accordance with the network address information acquired by the node Nn, and requests to start streaming of content data with respect to the upper stream node.

Next, the control unit 11 carries out a receiving process for the content data thus broadcasted (stream distribution) (Step 2). The packets of the content data thus received are reproduced and outputted while being accumulated in the buffer memory 13.

Next, the control unit 11 determines whether or not there is a downstream node connected to the own node (Step S3). When there is no downstream node (Step S3: NO), the control unit 11 goes to Step S5. When there is the downstream node (Step S3: YES), the packet of the content data thus received is transferred to the downstream node (Step S4). Then the process goes to Step S5.

In Step S5, the control unit 11 determines whether or not the content data thus received are accumulated as much as the unit. For example, the control unit 11 determines whether or not it is accumulated as much as the unit by detecting a segmentation in the content data (data indicative of the segmentation being previously indicated in the content data). Or the control unit 11 determines whether or not the data as much as the unit are accumulated by setting off the data every unit time (e.g. thirty minutes) from a predetermined time (e.g. ten o'clock).

Then in a case where the control unit 11 detects a segment in content data (or a lapse of the above unit time), it is judged that the content data as much as the unit are accumulated (Step S5: YES). Then the process goes to Step S6. In a case where it is judged that the data as much as the unit are not accumulated (Step S5: NO), the process goes to Step S10.

In Step S6, the control unit 11 randomly determines whether or not the content data as much as the unit is stored (by generating random numbers). When it is determined that the content data as much as the unit are stored (Step S6: YES), the process goes to Step S7. In a case where it is not determined the content data as much as the unit are not stored (Step S6: NO), the process goes to Step S10.

In Step S7, the control unit 11 memorizes and stores the content data as much as the unit in the memory unit 12.

Next, the control unit 11 adds the content ID to the content data as much as the unit thus stored (Step S8). For example, the control unit acquires the content ID added to a head of the content data as much as the unit and provide the content data with the content ID. Or the control unit 11 generates a broadcasting channel and a date of broadcast by hashing with a hash function common to that used in acquiring the node ID and acquires the content ID and provide it with the content data.

Next, the control unit 11 sends the publish message including the content ID given to the content data as much as the unit thus stored and the own node information to the root node in accordance with the routing table using the own DHT (Step S9). In other words, the node Nn having the node ID closest to the content ID is specified in view of the routing table, and the publish message is sent to the node Nn (thereafter transferred to the route node).

In Step S10, the control unit 11 determines whether or not broadcast of the content data is finished. In a case where it is not finished yet (Step S10: NO), the process returns to Step S2, and the process is repeated in a manner similar thereto. On the other hand, in a case where the broadcast of the content data is finished (Step S10: YES), the process is finished.

All the processes described above are carried out with respect to all node Nn participating in a topology related to the broadcasting channel. In each of the nodes Nn, the content data as much as the unit randomly determined are stored in another node Nn so as to be provided. Thus the content data as much as the unit are stored in and dispersed into a plurality of nodes Nn.

When users of each of the nodes Nn wish to reproduce and watch and/or listen to the content data as much as the units, the content existence inquiry message of the content data is sent to the root node from the user node as described above by designating the broadcast channel, the broadcast data and the like of the content data as much as the units required to listen. As a result, the user node receives stream distribution of the content data from the content node storing the content data as much as the units, thereby enabling the user to watch and/or listen to these. Meanwhile, although the content data as much as the units are immediately reproduced and outputted while being accumulated in the buffer memory, it is not stored in the memory unit 12. This is in order for efficiently using the memory unit 12 of each of the nodes Nn, participating in the distributed content storage system.

As described above, according to the embodiment, in a case where the content data as much as the units thus broadcasted are received, each of the nodes Nn randomly determines whether or not the content data as much as the units are stored. In a case where these are stored, the publish message including the content ID and otherwise, provided to the content data as much as the units thus stored, is sent to the root node. Since it is constructed as such, it is possible to avoid excessive load from being applied to a specific device such as a server, to efficiently use the memory unit 12 in each of the nodes Nn, to reproduce the content data as much as the units which are broadcasted in the past and not stored by each of the nodes Nn themselves by acquiring these, and to thereby efficiently record and reproduce the content as a whole system. Further, memory consumption in the memory units 12 of each of the nodes Nn can be reduced.

Further, since each of the nodes Nn randomly determines whether or not the content data as much as the units are to be stored every accumulation of the content data as much as the units, it is possible to the content data as much as the units are dispersed and stored on the distributed content storage system so as to be usable by other nodes Nn.

In the embodiment, there is described a mode that the content data as much as the units, which is broadcasted in the broadcasting channel selected by the user, are stored. As another mode, each of the nodes Nn randomly determines the broadcasting channel, the content data as much as the units, which are broadcasted in the broadcasting channel randomly determined, are stored, and the publish message is sent out. According to this mode, it is possible to disperse and store the content data broadcasted in wider broadcasting channels so as to be used on the distributed content storage system at every unit. Therefore, variety of content data as much as the units to be stored expands to thereby demonstrate more effectiveness.

For example, in a case where a predetermined time comes under a state that a user does not watch and listen the content (power-off state of display in display unit 16), the control unit 11 randomly determines the broadcasting channel receiving the content data to be stored. The control unit 11 starts a process shown in FIG. 5. In Step S1, the control unit 11 carries out a participation process to a topology related to the broadcasting channel thus determined. Then in a manner similar to the above embodiment, processes in Steps S2 to S10 are carried out. Further, in a case where the node Nn can receive mutually different content data broadcasted in a plurality of channels (e.g. separating communication port and buffer memory), it is possible to configure such that a broadcasting channel different from a broadcasting channel now watched and/or listen to by the user (so-called back channel) may be randomly determined, the content data as much as the units which are broadcasted by the broadcasting channel thus determined, and the publish message may be sent out.

Further, each of the nodes Nn determines a time for starting to receive the content data (starting process on FIG. 5). If, in a case where the time thus determined arrives, the broadcasting channel is randomly determined, or the broadcasting channel currently selected is determined, the content data as much as the units thus broadcasted in the broadcasting channel determined are stored, and the publish message is sent out, variety of the content data as much as the units further expands to thereby demonstrate more effectiveness.

Further, in the above embodiment, an example of the case where the present invention is applied to a broadcasting mode of a tree type has been described, the present invention is also applicable to the other broadcasting modes (e.g. broadcasting mode using electric wave, and broadcasting mode of a server client type).

Further, the distributed content storage system according to the above embodiment has been described on a premise that it is formed by the algorism using DHT. However, the present invention is not limited thereto.

The present invention is not confined to the configurations listed in the foregoing embodiments, but it is easily understood that the person skilled in the art can modify such configurations into various other modes, within the scope of the present invention described in the claims.

What is claimed is:

1. A plurality of node devices in a content data storing and sharing system, the content data storing and sharing system comprising the plurality of node devices including an administrative node device, the plurality of node devices and the administrative node device being connected through a network, the plurality of node devices storing content data to be shared by the plurality of node devices and the administrative node device administrating the content data to be shared by the plurality of node devices, wherein:

at least one node device in the plurality of node devices comprises:

a broadcast channel determination unit that randomly determines a broadcast channel, the content data to be stored being broadcasted in the broadcast channel;

a content receiving unit that receives the content data broadcasted in the broadcast channel determined by the broadcast channel determination unit;

a storage determining unit that randomly determines whether unit content data corresponding to a predetermined amount of the content data is to be stored in the node device, in response to receiving the unit content data which is broadcasted in the broadcast channel determined by the broadcast channel determination unit;

a storing unit that stores the unit content data in response to determining that the unit content data is to be stored; and a registration message transmission unit that sends a registration message, informing that the received unit content data is stored in the node device, to the administrative node device in response to storing the unit content data.

2. The node device according to claim 1,
wherein the storage determining unit randomly determines whether the unit content data is stored whenever the unit content data is received.

3. The node device according to claim 1,
wherein the unit content data is obtained by compartmentalizing with respect to each predetermined period.

4. The node device according to claim 1,
wherein the content data storing and sharing system has a plurality of hierarchy levels in a tree-like shape formed by a plurality of node devices while placing a broadcast device at a top of the hierarchy levels and connecting the plurality of node devices through a communication unit,
wherein content data broadcasted by the broadcast device is sequentially transferred from a node device at an upper hierarchy level to the node device at a lower hierarchy level, and
wherein the content receiving unit randomly determines whether the content data is to be stored in the node device.

5. A non-transitory computer-readable storage medium that stores a computer-executable program for a content data storing and sharing system, the content data storing and sharing system comprising a plurality of node devices including an administrative node device, the plurality of node devices and the administrative node device being connected through a network, the plurality of node devices storing content data to be shared by the plurality of node devices and the administrative node device administrating the content data to be shared by the plurality of node devices, the program being stored in at least one node device in the plurality of node devices, the program comprising instructions for:

at least one node device in the plurality of node devices performing steps of:

determining a broadcast channel randomly, the content data to be stored being broadcasted in the broadcast channel;

receiving the content data broadcasted in the determined broadcast channel;

determining randomly whether unit content data corresponding to a predetermined amount of the content data is to be stored in the node device, in response to receiving the unit content data which is broadcasted in the determined broadcast channel;

storing the unit content data, in response to determining that the unit content data is to be stored; and sending a registration message, informing that the received unit content data is stored in the node device, to the administrative node device, in response to storing the unit content data.

6. The non-transitory computer-readable storage medium according to claim 5,
wherein the content data storing and sharing system has a plurality of hierarchy levels in a tree-like shape formed by a plurality of node devices while placing a broadcast device at a top of the hierarchy levels and connecting the plurality of node devices through a communication unit,
wherein content data broadcasted by the broadcast device is sequentially transferred from a node device at an upper hierarchy level to the node device at a lower hierarchy level, and
wherein the content receiving unit randomly determines whether the content data is to be stored in the node device.

7. A content data storing and sharing system, the content data storing and sharing system comprising a plurality of node devices including an administrative node device, the plurality of node devices and the administrative node device being connected through a network, the plurality of node devices storing content data to be shared by the plurality of node devices, the administrative node device administrating the content data to be shared by the plurality of node devices and providing node information of the node devices which store the content data in response to a request from the node devices, wherein:

at least one node device in the plurality of node devices comprises:

a broadcast channel determination unit that randomly determines a broadcast channel, the content data to be stored being broadcasted in the broadcast channel;

a content receiving unit that receives the content data broadcasted in the broadcast channel determined by the broadcast channel determination unit;

a storage determining unit that randomly determines whether unit content data corresponding to a predetermined amount of the content data is to be stored, in response to receiving the unit content data which is broadcasted in the broadcast channel determined by the broadcast channel determination unit;

a storing unit that stores the unit content data, in response to determining that the unit content data is to be stored; and a registration message transmission unit that sends a registration message, informing that the received unit content data is stored in the node device, to the administrative node device administrating the content data, in response to storing the unit content data, wherein the administrative node device which administrates the content data comprising:

a message receiving unit that receives the registration message; and a node information registration unit that registers the node information of the node device that stores the unit content data in response to the received registration message.

8. The content data storing and sharing system according to claim 7,
wherein the content data storing and sharing system has a plurality of hierarchy levels in a tree-like shape formed by a plurality of node devices while placing a broadcast device at a top of the hierarchy levels and connecting the plurality of node devices through a communication unit, wherein content data broadcasted by the broadcast device is sequentially transferred from a node device at an upper hierarchy level to the node device at a lower hierarchy level, and wherein the content receiving unit randomly determines whether the content data is to be stored in the node device.

9. A content data storing method in a content data storing and sharing system, the content data storing and sharing system comprising a plurality of node devices including an administrative node device, the plurality of node devices and the administrative node device being connected through a network, the plurality of node devices storing content data to be shared by the plurality of node devices, the administrative node device administrating the content data to be shared by the plurality of node devices and providing node information of the node devices which store the content data in response to a request from the node devices, the method comprising:

at least one node device in the plurality of node devices performing steps of:

determining a broadcast channel randomly, the content data to be stored being broadcasted in the broadcast channel;

receiving the content data broadcasted in the determined broadcast channel;

determining randomly whether unit content data corresponding to a predetermined amount of the content data is stored, in response to receiving the unit content data which is broadcasted in the determined broadcast channel;

storing the unit content data, in response to determining that the unit content data is to be stored; and sending a registration message, informing that the received unit content data is stored in the node device, to the administrative node device administrating the content data, in response to storing the unit content data.

10. The content data storing method according to claim 9, wherein the content data storing and sharing system has a plurality of hierarchy levels in a tree-like shape formed by a plurality of node devices while placing a broadcast device at a top of the hierarchy levels and connecting the plurality of node devices through a communication unit, wherein content data broadcasted by the broadcast device is sequentially transferred from a node device at an upper hierarchy level to the node device at a lower hierarchy level, and wherein the content receiving unit randomly determines whether the content data is to be stored in the node device.

\* \* \* \* \*